(12) United States Patent
Lee

(10) Patent No.: US 11,741,057 B2
(45) Date of Patent: Aug. 29, 2023

(54) UNIFIED DATA OBJECT MANAGEMENT SYSTEM AND THE METHOD

(71) Applicant: Yong Jae Lee, Seoul (KR)

(72) Inventor: Yong Jae Lee, Seoul (KR)

(*) Notice: Subject to any disclaimer, the term of this patent is extended or adjusted under 35 U.S.C. 154(b) by 163 days.

(21) Appl. No.: 17/078,865

(22) Filed: Oct. 23, 2020

(65) Prior Publication Data
US 2021/0042274 A1    Feb. 11, 2021

Related U.S. Application Data

(63) Continuation of application No. 14/897,355, filed as application No. PCT/KR2014/004993 on Jun. 5, 2014, now Pat. No. 10,853,330.

(30) Foreign Application Priority Data

Jun. 10, 2013    (KR) ........................ 10-2013-0065894

(51) Int. Cl.
| | |
|---|---|
| G06F 16/21 | (2019.01) |
| G06F 16/23 | (2019.01) |
| G06F 16/955 | (2019.01) |
| G06F 16/93 | (2019.01) |
| G06F 16/28 | (2019.01) |

(52) U.S. Cl.
CPC .............. *G06F 16/21* (2019.01); *G06F 16/23* (2019.01); *G06F 16/289* (2019.01); *G06F 16/93* (2019.01); *G06F 16/9558* (2019.01); *G06F 16/9566* (2019.01)

(58) Field of Classification Search
CPC .. G06F 16/21; G06F 16/9566; G06F 16/9558; G06F 16/23; G06F 16/289; G06F 16/93

USPC ......................................................... 707/803
See application file for complete search history.

(56) References Cited

U.S. PATENT DOCUMENTS

| | | | | |
|---|---|---|---|---|
| 7,840,524 | B2 * | 11/2010 | Egger | G06F 16/248 |
| | | | | 707/711 |
| 8,488,142 | B2 | 7/2013 | Miyazaki et al. | |
| 8,713,025 | B2 * | 4/2014 | Eder | G06F 16/951 |
| | | | | 707/711 |
| 8,954,444 | B1 * | 2/2015 | Retzlaff, II | G06F 16/319 |
| | | | | 707/711 |

(Continued)

FOREIGN PATENT DOCUMENTS

| | | |
|---|---|---|
| CN | 101425061 A | 5/2009 |
| CN | 102880687 A | 1/2013 |

(Continued)

OTHER PUBLICATIONS

Korean Office Action of KR10-2013-0065894 dated Aug. 28, 2014.

(Continued)

*Primary Examiner* — Shahid A Alam
(74) *Attorney, Agent, or Firm* — Sughrue Mion, PLLC

(57) ABSTRACT

The present invention relates to a management system, a search method, and a browsing method of a unified data object using a tag object. A unified data object management system and method may efficiently access and manage the data object by storing and managing the unified data objects including a file, non-file data, or dynamic data on the basis of the tag object and then providing a search result based on the tag object when a search command is entered by a user.

25 Claims, 9 Drawing Sheets

(56) References Cited

U.S. PATENT DOCUMENTS

| | | | |
|---|---|---|---|
| 2004/0015369 A1 | 1/2004 | Kim et al. | |
| 2007/0106843 A1* | 5/2007 | Mori | G06F 1/3268 711/114 |
| 2007/0299969 A1* | 12/2007 | Kunitake | G06F 16/93 709/225 |
| 2008/0141045 A1* | 6/2008 | Abiko | G06F 21/10 713/193 |
| 2012/0059926 A1 | 3/2012 | Jung et al. | |
| 2012/0105901 A1 | 5/2012 | Miyazaki et al. | |

FOREIGN PATENT DOCUMENTS

| | | | | |
|---|---|---|---|---|
| JP | 11-203183 A | 7/1999 | | |
| JP | 2010-257169 A | 11/2010 | | |
| KR | 10-2003-0013778 A | 2/2003 | | |
| KR | 10-0884200 B1 | 2/2009 | | |
| KR | 10-0940365 B1 | 2/2010 | | |
| KR | 2010-0120905 A | 11/2010 | | |
| KR | 10-1153937 B1 | 6/2012 | | |
| WO | WO 2005078606 | * | 8/2005 | G06F 16/30 |
| WO | 2010/137640 A1 | 12/2010 | | |

OTHER PUBLICATIONS

International Search Report of PCT/KR2014/004993 dated Aug. 29, 2014.

Communication dated May 17, 2017, issued by The State Intellectual Property Office of People's Republic of China in counterpart Chinese application No. 201480045099.5.

Ando Toshaki, "Data Management Device and Record Medium", JP11203183A, English Translation, Jul. 30, 1999.

* cited by examiner

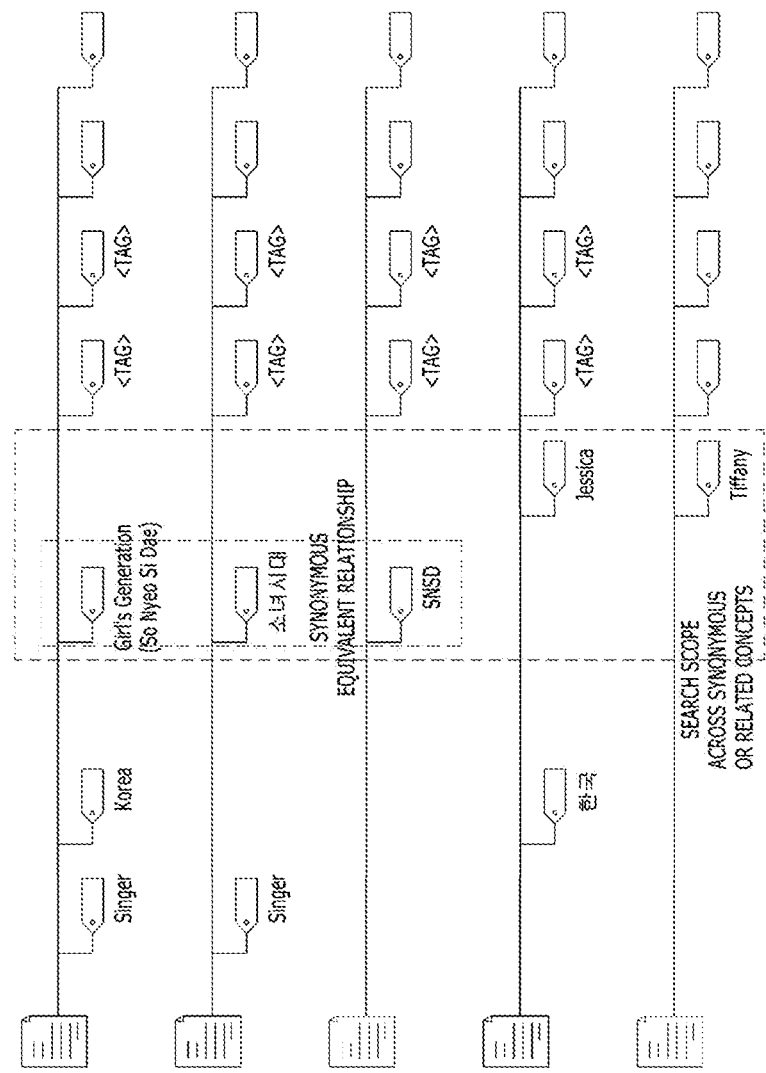

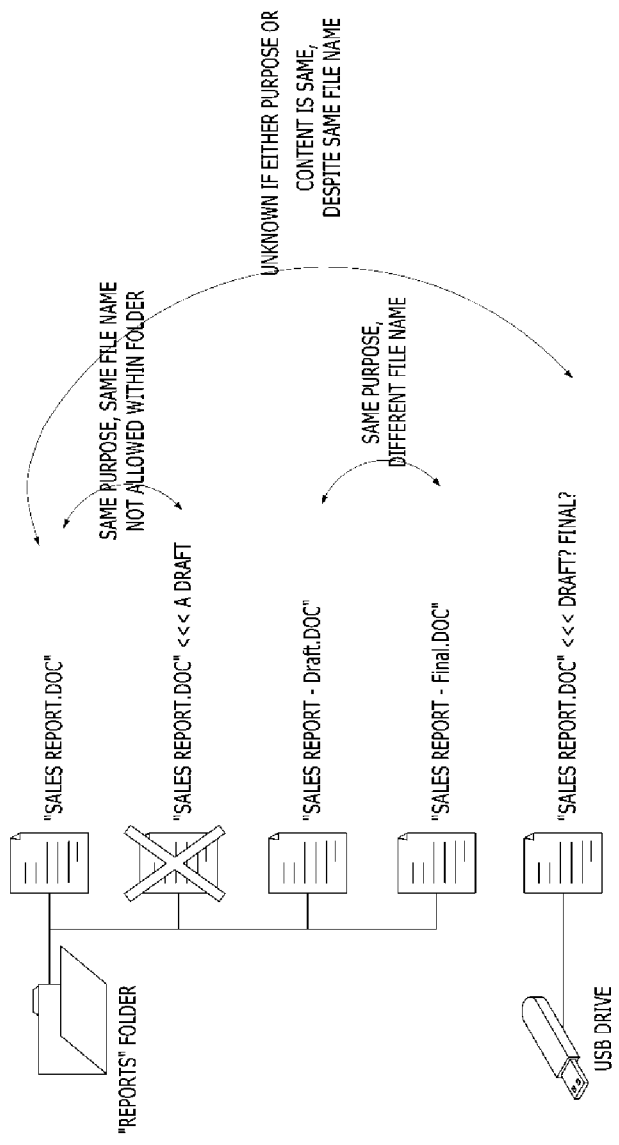

UNIFIED DATA OBJECT MANAGEMENT SYSTEM AND THE METHOD

CROSS REFERENCE TO RELATED APPLICATIONS

This is a continuation application based on U.S. application Ser. No. 14/897,355, filed Dec. 10, 2015, which is a National Stage of International Application No. PCT/KR2014/004993, filed Jun. 5, 2014, claiming priority based on Korean Patent Application No. 10-2013-0065894, filed Jun. 10, 2013, the contents of which are herein incorporated by reference in their entireties.

TECHNICAL FIELD

The present invention relates to a system and method for managing a data object, and more particularly, to a method and system for effectively managing various forms of data such as a file, non-file data, and dynamic data over the Internet and network environment including a cloud or through various kinds of devices such as a computer or smart device.

BACKGROUND ART

Today, the widespread adoption and usage of various devices, such as computers and smart devices, are becoming prevalent and commonplace. This trend is subsequently driving user data to skyrocket for all kinds of users—personal, corporate, various types of organizational users as well as governments'. Worse, this rapid explosion of data is not only in terms of its volume, but also its variety. However, despite this significant increase in both the diversity and complexity of user data, the technology to manage and organize such user data hasn't improved or changed much. Most user data takes the form of various "files". Also, user data is stored as in-app data or proprietary program data across various applications/programs on computer or smart device. In other cases, user data exists as web content or resides on the "cloud"; that is, on a network or on the Internet.

All these diverse forms of user data, coupled with the limitations of existing technologies, add up to the increase in complexity and inconsistency in dealing with user data, not to mention the increase in users' required efforts and inconvenience. Furthermore, user data is neither being recognized, organized, nor processed organically in relation to and "centered around" user.

This is because different kinds of user data each require using different management schemes: the hardware-based, technology-centric management scheme such as file system (e.g., FAT32 or NTFS); as opposed to schemes for various application data; or schemes for managing user data on a network or in the cloud. There currently exists no such consistent management system that organically connect and relate such variety of user data across and beyond these different schemes.

Hence, as the amount or diversity of data increases, a user has to deal with even more file names and "Folder" (or "directory"; henceforth "folder") paths. And, the user may have to jump back and forth between different devices, such as computer and smart device, or between the Internet and a variety of applications (such as email, calendar, contacts app, or billing program, etc.) just to get a job done. As a result, the responsibility of tracking down, collecting, and relating (making sense of) dispersed/fragmented data falls on the user.

In particular, the folder-based "File System", the technology for organizing and storing file data, is ubiquitously used on computers, various devices, and even on cloud storage services. However, the technology is not very intuitive nor user-friendly, and it comes with inherent inefficiency: in order to deal with user data in the form of "file", a user must know the file name or at least part of its "file path" to conduct any search or management task; yet, these file/folder names are often not meaningful enough and therefore insufficient in effectively identifying user data; or, it may be meaningless altogether as in "IMG_001.jpg" file from a digital camera. Furthermore, the folder system, which are commonly used across file systems on hardware-based storage media—such as hard drives, SSDs (Solid State Drives), and memory cards—as well as storage locations such as cloud storage, is based on the "Tree" structure, which is the very cause for hierarchical problems in dealing with file data.

Tree structure always requires hierarchy among folders. It forces to specify and save folders in a particular order by creating a "Path" (or directory/folder/file path; henceforth "path")—even when such hierarchical relationship is non-existent in reality and thereby not necessary. For example, in such cases as "c:\report\sales" and "c:\sales\report", where the order among the folders in a path is arbitrary and meaningless. And, forcing such hierarchy among folders at all times—irrespective of necessity—creates several problems: it confuses users when creating or locating a folder; it often causes redundant folders; as a result, it increases time and costs in locating, accessing, using, and/or managing files.

Also, tree structure requires that a specific file name must be "mutually exclusive" in each specific folder, to allow only one name instance to exist for each unique file name per folder. This means that every revision to a file must result in either: overwriting an existing file and losing its previous content; or, creating an entirely new file with a new name, such as "report-draft.doc", "report-revision-01.doc", and etc.—every time there is a revision. Additionally, in cases where multiple revision files exist under different names, or in other cases where multiple revision files are copied to different locations and exist under the same file name, there is no easy way to identify or compare such relationships, the extent of revisions, or the order of such revisions. The only way possible is that a user directly examine and verify them, which would be inconvenient. This "co-existence" or "mixed-up" existence of multiple revision files gets worse by making it particularly confusing and difficult to manage, sync, and use data when multiple users share and revise those supposedly "identical" files such as documents.

Consistent and uniform data management becomes even more difficult for "Non-File Data", which does not take the form of files and instead exists as internal data within particular program or application (such as a calendar appointment item, an address book entry, etc.) Non-file data is isolated and independent from any file systems, making it impossible to group or organize using the folders from file system. Although some simple internal/proprietary folders or folder-like grouping mechanism may be provided within program, it's entirely up to each application/program to offer such functionalities. Therefore, for non-file data, the classifying/organization schemes and related data content greatly vary, and are prone to inconsistency and incompatibility. However, this inconsistency and incompatibility is not necessarily each individual application's fault. Rather, it is due to the lack of common technological foundation or platform to implement such consistency and compatibility.

In another aspect, the same inconsistency and incompatibility problems apply to search of non-file data as well. While some small number of applications (such as "Address Book" or "Calendar") on smart devices may provide ability to search in-app data, they are limited to particular hardware or specific OS platform, and those manufacturers/developers offer such functionality for particular purposes only. Hence, it is currently near impossible for most applications to support or provide general search of user data, irrespective of hardware or OS platform. No such technological foundation or platform exists. Moreover, any existing non-file data search—along with file data search—is limited in terms of search method, criteria, and breadth; and is only capable of relatively mediocre results, so it's difficult to get a fast and rich search result as users would expect from a web search.

For web search, it is fast and efficient. However, it works by searching text-based content of web pages or nearby images. So, its subjects/targets are mostly limited to public web pages and their contents, making it limited in terms of search condition, scope, and searchable content/type. Thus, web search is not appropriate for various types of files in non-text format or for any application data—without any enclosing description of a web page. Further, it lacks security features/functionalities for non-public data (such as most documents and resources owned by individuals or corporations) as well as other management functionalities other than search.

More importantly, any text-based search, including web search, basically works by comparing texts without understanding each item's purpose or context. Thus, the fidelity of search results deteriorates since the organic relationships among data objects cannot be fully grasped or understood around user's perspective. Some web search engines offer "related keywords" or "popular keywords" to user. However, these are simply the calculated results displayed based on the statistics of what keywords are simultaneously entered by many users, and such frequency; they don't reflect any real "understanding" of the content within each web page. Hence, the usefulness of such web search technologies is not applicable to searching any non-public user data, such as files or application data. This is due to several key differences between user data search and web search. First, the purpose and motivation of conducting a search on one's own data may be very different from those of web search. Also, user data search is far more specific and/or diverse in terms of subject data. Secondly, for user data search, there usually don't exist enough number of users and search requests to calculate statistically meaningful search keywords.

Today, web content—such as web pages, internet media files (e.g., photos), and SNS (Social Networking Service) postings—is isolated from typical user data: not only in terms of its forms and search method; but also in terms of management and storage. Typical web contents are either entered as text through web browser, SNS service, or a particular application; or uploaded by specifying the path to individual media files, such as photos. Then, they are arbitrarily stored and managed on web servers, blog engines, or SNS servers. Thus, sharing a large amount of various user data (including file, non-file, etc.) on the Internet requires additional efforts by user—such as making uploads. In addition, saving any web content in a more usual form (such as file) also requires the inconvenience of individually selecting, downloading, and storing such content.

Among many data structures that are used to classify/organize various types of data is—in addition to the "tree" structure—the "tagging" concept. Unlike tree structure, the tagging concept permits overlapping classification/grouping by applying multiple tags. By applying a common "tag", multiple items can be classified into a "set" or a "group". By assigning multiple tags in an overlapping manner, an item can be made to qualify for two or more classifications. Currently, "tag" exists mostly in two forms of technology.

One is the "Web Search Tag" (or "Hashtag"), which is used to increase exposure to search engines—the exposure of web pages, blogs, or SNS postings. It works by directly inserting "search keyword" text string(s) to web page, and this also includes "Tag Cloud" used on Internet web sites, or blogs, etc. But, this type of "tag" is merely a "Search Index" that assists applicable text-based content's exposure to search requests, and cannot be used on common files unless it's in text format.

Second type is the "File Tag", which permits internal embedding of tags within some particular file types that support it, such as JPEG photos or MP3 music files. Applications that recognize these files—photo gallery, music player app, and so on—are able to classify/organize them quite flexibly. But, this is possible with only certain types of file formats. This cannot be used for managing user data in general—for example, classifying/organizing other types of (not supported) file formats, or application's internal data, and so on, in a consistent manner.

As shown above, both conventional "tag" types only exist as inserted text strings in either the source text of a web page, or a file. And, they all are merely an application of concept, rather than a concrete technology. It is because there exists no concrete technology system, which specifies/decides the form, compatibility, and consistent management method—to enable "tag" to exist as an independent object. And, it's also because those conventional tags are tied to and may not become independent of particular applications, resulting in the lack of consistency and limited functionality. In most cases, applying/assigning a tag requires user's direct entry of applicable text string, and it's inconvenient and inefficient. Further, applying multiple tags or assigning a tag repeatedly across multiple data items is even more inconvenient and frustrating, while the benefit in return may be small or non-existent. Also, even painstakingly applied tags may include incorrect or misspelled text string(s). Or, accurately entered tags may be skipped upon in search results—when variations are possible in search keyword string. Moreover, the fact that there may exist many varieties of search keywords even for a single topic (e.g., "United States", "US", and "America") reduces the usefulness of such text-based search. Also, considering any benefit of traditional tags are realized "only when such tags are searched upon and included in the result", applying/assigning sufficient number of tags to a large amount of user data—including countless files—would be only expensive and not practical. Therefore, despite being far more flexible than tree structure, those existing conventional "tags" are very limited in their usefulness: they are not easy to use and/or manage; they are not widely applicable—for user data in general.

DISCLOSURE

Technical Problem

To solve the above problems, the present invention is intended to provide a technique for consistently and universally managing and searching for a variety of user data distributed over various kinds of files or applications, irrespective of the form of the user data, thus allowing the user data to be organized and managed on the basis of a user's intention on, or use of, the data, irrespective of a physical or technical form such as a file.

To this end, the present invention can remove inefficiency in management, such as file duplication or version difference, and inconvenience in synchronization from conventional techniques by defining and managing the user data as the logical object based on the purpose and use; and by defining various versions of the user data, such as the change history or file revision for the content, as the version object(s).

In addition, the present invention is intended to provide a management system that provides flexible classification/organization and search of the user data that are free from constraints of a folder and a tree structure. The management system may express various classifications and configurations, such as a subset, an intersection, and a union, according to characteristics of tagged/taggable objects that are freely set and assigned by the user, may provide a browsing and/or search method better than the existing search method, and also may provide wide management functions, such as various security functions, e.g., user permission/rights management and encryption, and application scopes of these settings.

When assigning a basis of the classification/organization to the user data and conducting browsing/search for the user data, the management system enhances/expands and applies the tag concept to facilitate easy assignment/management in order to meet the needs for and to create a technical system in which a criteria is dependent on the string itself and the meaning and the user's intention can be understood, may set "synonymous/equivalent meaning" or "inclusion/containment relationship or association/dependency relationship" such that various tags may be recognized according to the meaning rather than the string itself, and may allow the ontology (semantic relationship) data to be transmitted/shared to increase its utility and allow the tags and the user data to be browsed or searched for reflecting the semantic relationships.

According to those described above, the present invention also provides a technique for implementing the sharing and use of the tags and user data in various forms, consistently and easily managing a variety of data from the perspective of and centered around on user in a device such as a computer and a smart device and a complex environment such as cloud, mobile, and social computing, and efficiently performing the access, such as browsing and search, use, and sharing of the various data.

Technical Solution

In one general aspect, a unified data object management system includes: a logical object management unit configured to manage a logical entity object of a unified data object composed of a file, non-file data, or dynamic data, assigned with one or more pieces of tag information, managed by the tag information, and shared and/or transmitted across various applications, user accounts, devices, and/or servers; a version object management unit configured to manage a version entity object of the unified data object; and a unified data object conversion unit configured to obtain/derive a name of a folder of a file system, metadata of a file included in the folder, a name of the file of the file system, or metadata of the file of the file system as the tag information and incorporate the obtained/derived tag information into a data item included in the file system or the folder to convert the data item into the unified data object, in which the version object management unit creates and manages the version entity object of the unified data object when the unified data object is created or modified, and provides the unified data object according to the version entity object when the unified data object is requested.

The logical object management unit may assign a unique ID to the created unified data object or version entity object when the unified data object or the version entity object is created and may perform modification, deletion, display of related information, display of preview, or output of contained data on the unified data object or version entity object assigned with the unique ID when the unique ID is given.

The dynamic data may include a function or dynamic data, such as dynamic web content, a database query result, real-time data, or computational result, which is expressed in the form of a uniform resource locator (URL).

The unified data object may include a plurality of unified data objects and may include an aggregate unified data object created based on a user's need/convenience or related/relevant usage information.

In another general aspect, a ubiquitous tag object system includes: a tag object storage unit configured to store a tag object composed of a tag string having zero or one or more characters, a tag ID, and information regarding zero or one or more tag types (tag type information) and shared and/or transmitted across various applications, user accounts, devices, and/or servers; and a tag object management unit configured to create, modify, or delete the tag object.

The tag information may further include auxiliary tag type information or tag user information, and the auxiliary tag type information may include description of a format or content of the tag type information. The tag user information may include at least one of permission/rights information regarding the tag object, tag order/priority information regarding the tag object, permission/rights information regarding a data item to which the tag object is applied, security settings information related to encryption of the data item to which the tag object is applied, and tag application scope information regarding the data item to which the tag object is applied.

The tag object management unit may create the tag order/priority information regarding the tag object using the at least one of the permission/rights information regarding the tag object, the permission/rights information regarding the data item to which the tag object is applied, the security settings information related to encryption of the data item to which the tag object is applied, and the tag application scope information regarding the data item to which the tag object is applied.

The tag object management unit may create an aggregate ubiquitous tag including a plurality of tag objects based on a user's need/convenience or related/relevant usage information and may store and manage the aggregate ubiquitous tag in the tag object storage unit.

The tag object management unit may take as input one or more tag strings or one or more tag IDs and output a collection/set of tag IDs of tag objects including the tag strings or a collection/set of tag strings of tag objects including the tag IDs.

The tag object management unit may take as input one or more tag strings or one or more tag IDs, select the tag objects, express operated relationship between the tag objects by applying "&", "&&", "|", "||", "+", "−", ";", ",", "AND", "OR", "XOR" or "NOT" tag operator/notation when the tag objects are selected by the plurality of tag strings or the plurality of tag IDs, and apply "("and")", "[" and "]", or "{" and "}" to determine an order and/or scope when there is one or more tag operators/notations.

The ubiquitous tag object system may include: a tag traversal processing unit configured to take as input one or more tag strings or one or more tag IDs and output information on a tagged/taggable object assigned with a tag object including the tag string or the tag ID or a tag string or tag ID of another tag assigned to the tagged/taggable object; a semantic tag object search unit configured to search for a tag object including the tag string and a tag object having a meaning corresponding to a synonymous/equivalent relationship, inclusion/containment relationship, or association/dependency relationship with the tag; a semantic tag object configuration unit configured to set or modify ontology (semantic relationship) data regarding the tag object including the tag string and the synonymous/equivalent relationship, inclusion/containment relationship, or association/dependency relationship with the tag; an ontology (semantic relationship) data sharing/transmission unit configured to share or transmit the ontology (semantic relationship) data regarding the tag object including the tag string and the synonymous/equivalent relationship, inclusion/containment relationship, or association/dependency relationship with the tag; and a dynamic ontology loading unit configured to dynamically download and install/apply ontology (semantic relationship) data from another ubiquitous tag object system present in a trusted server list when there is not valid ontology (semantic relationship) data regarding the tag object including the tag string and the synonymous/equivalent relationship, inclusion/containment relationship, or association/dependency relationship with the tag.

In still another general aspect, a unified data object management service system includes: a unified data object management unit configured to manage a unified data object composed of a file, non-file data, or dynamic data, assigned with one or more tag objects, managed by the tag objects, and shared and/or transmitted across various applications, user accounts, devices, and/or servers; and a tag object management unit configured to manage a tag object composed of a tag string having zero or one or more characters, a tag ID, and information regarding zero or one or more tag types (tag type information), shared and/or transmitted across various applications, user accounts, devices, and/or servers, and assigned to the unified data object.

The tag object management unit may create and manage a data-linked tag object including information regarding the unified data object to express the unified data object, and the unified data object management unit may access and/or manage the unified data object such that a unified data object encapsulated in and/or linked to the data-linked tag object is assigned to another unified data object in the form of a tag object.

In still another general aspect, a unified data object management service system includes: a unified data object management server configured to apply/set a tag object in unified data object composed of a file, non-file data, or dynamic data, manage the unified data object based on the tag object, and provide the unified data object when the unified data object is requested; and a user device configured to create, search for, or manage the unified data object in communication with the unified data object management server.

Advantageous Effects

According to an embodiment of the present invention, it is possible to universally and consistently access and manage a variety of user data such as a file, an internal application data, real-time news information, or dynamic data, e.g., network streaming as an tagged unified data object or unified data object. In particular, dynamic data created by any function on a network is called a dynamic unified data object. For this, authentication information or parameter data may be additionally included.

According to an embodiment of the present invention, when user data is modified/revised or has several versions for any common purpose and use, the unified data object may be used to group and manage the user data or versions as one logical data object.

According to an embodiment of the present invention, the unified data object may be defined by combining two or more of other unified data objects, and may be called an aggregate unified data object. The user may use the aggregate unified data object to easily manage several unified data objects at once.

According to an embodiment of the present invention, the unified data object can avoid a fixed tree structure of a folder, perform management by applying the concept "tag," and enable flexible organization and intuitive classification and search of the objects.

In addition, according to an embodiment of the present invention, the ubiquitous tag object can be used/reused repeatedly to avoid unnecessary inputs, shared and/or transmitted over multiple users, applications, devices, and network servers, and assigned to a tagged/taggable object such as a file or unified data object to manage the tagged/taggable object by assigning an ID and storing a string value (having zero or one or more characters).

According to an embodiment of the present invention, the ubiquitous tag object may include permission/rights information regarding the access and use of the ubiquitous tag object itself and tag order/priority information between several ubiquitous tag objects. The ubiquitous tag object may also include permission/rights information regarding the access and use of the tagged/taggable object assigned with the ubiquitous tag object, security settings information associated with encryption, and tag application scope information.

According to an embodiment of the present invention, the ubiquitous tag object may be defined independently for various scopes such as a user, a user group, an entire system, and a cloud. The ubiquitous tag object is allowed to exist or be assigned in an overlapping manner. When multiple ubiquitous tag objects overlap, effective ubiquitous tag object(s) may be selected automatically according to the use context or by the user. In such case where the ubiquitous tag objects have conflicting "settings information", the ubiquitous tag object(s) may be applied based on determined priorities using the tag order/priority information of the ubiquitous tag object(s), or based on arbitrarily determined priorities without referring to the tag order/priority information.

According to an embodiment of the present invention, the ubiquitous tag object may be defined by combining two or more of other ubiquitous tag objects, and may be called an aggregate ubiquitous tag object (aggregate ubiquitous tag). The user may use the aggregate ubiquitous tag object to easily assign and manage several tags at once.

According to an embodiment of the present invention, the ubiquitous tag object may set a semantic relationship such as a synonymous/equivalent relationship (same/similar concept), inclusion/containment relationship, or association/dependency (generalization/specialization) relationship, which is called ontology (semantic relationship) data or ontology. When the ontology (semantic relationship) data is used to browse or search for the tagged/taggable object, the ubiquitous tag object having the semantic relationship may be displayed in addition to the ubiquitous tag object selected using a specific string. This is called semantic tag access or semantic tag search (or, semantic tag browsing).

According to an embodiment of the present invention, the ontology (semantic relationship) data may be shared and/or transmitted across users, groups, or systems/servers. In particular, when essential ontology (semantic relationship) data regarding the ubiquitous tag object is invalid or not present, the ontology (semantic relationship) data may be downloaded from a server, which is set in the trusted server, set, and then used by registering a trusted server list between systems or servers. This is called dynamic ontology loading.

According to an embodiment of the present invention, it is possible to traverse tags having various contexts accompanied through the tagged/taggable object and provide more flexible, multi-dimensional browsing and search methods by browsing and outputting another ubiquitous tag object assigned to the tagged/taggable object such as a file having the ubiquitous tag object applying thereto and the unified data object. This is called tag traversal, through which relationships between various objects may be intuitively and variously analyzed/compared to obtain/derive data for big data analysis.

According to an embodiment of the present invention, it is possible to provide traversal including a tag having a semantic relationship such as a synonymous/equivalent relationship (same/similar concept), inclusion/containment relationship, or association/dependency (generalization/specialization) relationship and provide more effective, various browsing and search methods based on wide semantic relationships by combining the tag traversal and the semantic tag access. This is called semantic tag traversal.

According to an embodiment of the present invention, the ubiquitous tag object may be defined to represent a tagged/taggable object including the unified data object. This is called data-linked tag object (representational data tag object). For example, the user may create the data-linked tag object including a name from the tagged/taggable object such as the unified data object having detailed data such as biographical information. Accordingly, the tagged/taggable object can be assigned in the form of a tag. In addition, the data-linked tag object encapsulates relevant tagged/taggable objects, and thus the concept and function may be expanded to implement complex and various objects and concepts.

According to an embodiment of the present invention, the unified data object and the ubiquitous tag object may obtain/derive a folder name or file metadata of a folder or file included in a file system as the tag information and may easily perform creation by converting files or their tag information.

DESCRIPTION OF DRAWINGS

FIG. 2 is a diagram showing a relationship between a unified data object and a tag object.

FIGS. 3A and 3B are diagrams illustrating a version entity object of a unified data object.

MODES OF THE INVENTION

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

Figure 1:
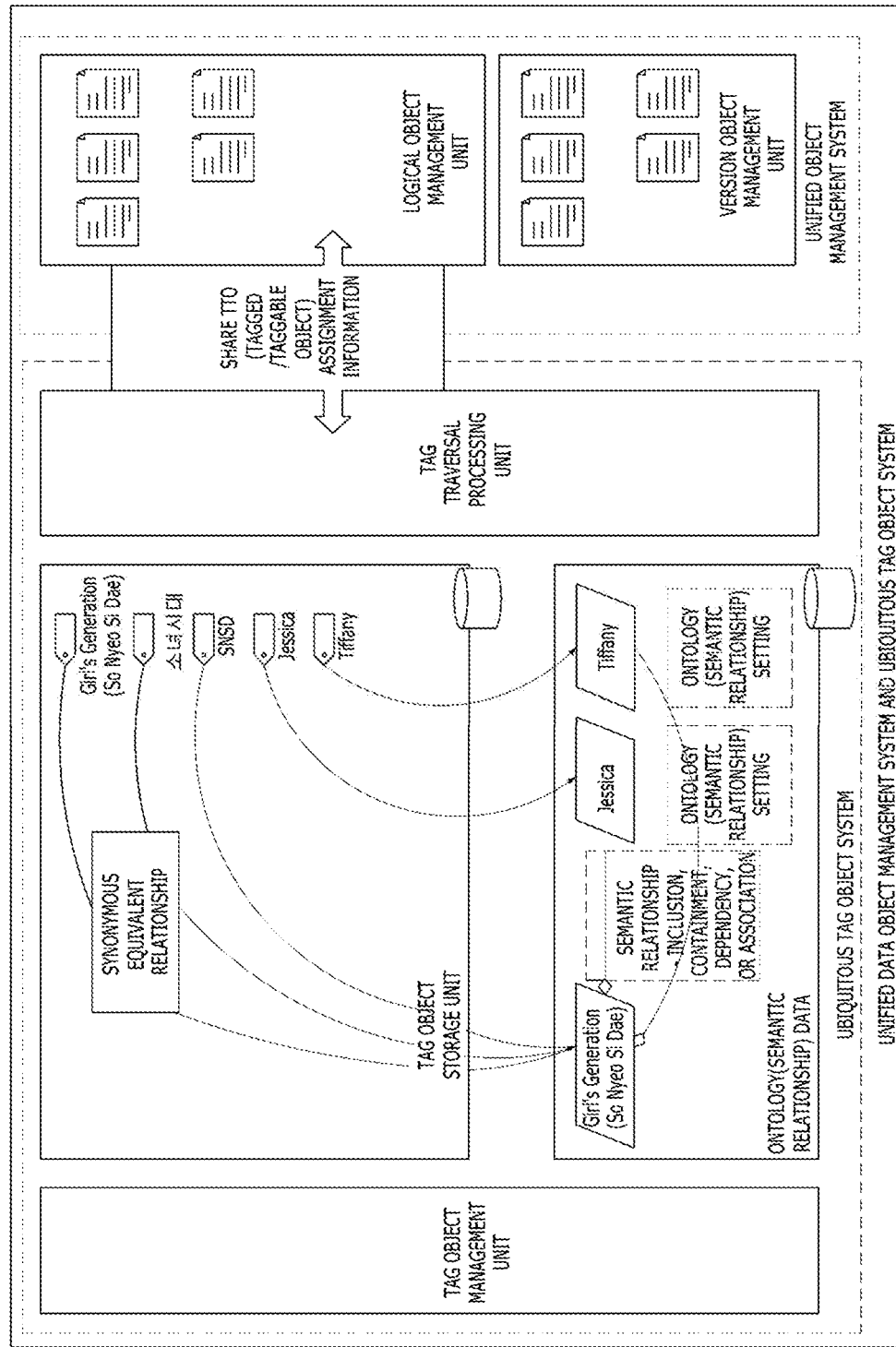
FIG. 1 is a diagram showing a unified data object management system and a ubiquitous tag object system according to an embodiment of the present invention.

FIG. 1 is a diagram showing a unified data object management system and a ubiquitous tag object system according to an embodiment of the present invention.

The unified data object management system according to an embodiment of the present invention includes a logical object management unit and a version object management unit.

The term "unified data object" used herein denotes all forms of data objects including a file, non-file data, and dynamic data. The unified data object is composed of the file, the non-file data, and the dynamic data; assigned with information regarding one or more tags; and managed by the tag information. The unified data object can be shared and/or transmitted across various applications, user accounts, devices, and/or servers.

The unified data object includes a logical entity object and a version entity object. The logical entity object includes all of the remaining data other than the version entity object among data included in the unified data object.

The logical object management unit of the unified data object management system manages the logical entity object of the unified data object. The version object management unit manages the version entity object of the unified data object.

The version entity object of the unified data object will be described below with reference to FIG. 3.

The ubiquitous tag object system according to an embodiment includes a tag object storage unit and a tag object management unit.

The ubiquitous tag object denotes an object that can be used/reused repeatedly to avoid unnecessary inputs and can be shared and/or transmitted over multiple users, applications, devices, and network servers by assigning an ID using a tag assigned to the unified data object and storing a string value (having zero or one or more characters).

The ubiquitous tag object is stored and managed by the tag object storage unit. The tag object management unit manages creation, modification, or deletion of the ubiquitous tag object.

According to another embodiment of the present invention, the ubiquitous tag object system may further include ontology (semantic relationship) data. The ontology (semantic relationship) data denotes data regarding a synonymous/equivalent relationship, inclusion/containment relationship, or association/dependency relationship between tag objects and may also provide a tag object having a semantic relationship with a specific tag object when the specific tag object is requested.

Accordingly, the tag objects having the semantic relationship may all be included and managed in the unified data object. Therefore, even when only a limited number of tag objects are assigned to the unified data object, all of the tag objects having the semantic relationship may be provided by the ontology (semantic relationship) data of the ubiquitous tag object system.

FIG. 2 shows that a tag object is assigned to a unified data object.

The unified data object may be assigned with one or more tag objects and may be classified and searched for by the tag objects and provided to a user.

A tag object including a plurality of tag objects, i.e., an aggregate ubiquitous tag may be created and a service may be provided using the aggregate ubiquitous tag on the basis of a user's need/convenience or related/relevant usage information. That is, all related unified data objects may be provided through the aggregate ubiquitous tag as a single tag object by including different tag objects that are relevant and often used at the same time.

Figure 3B:
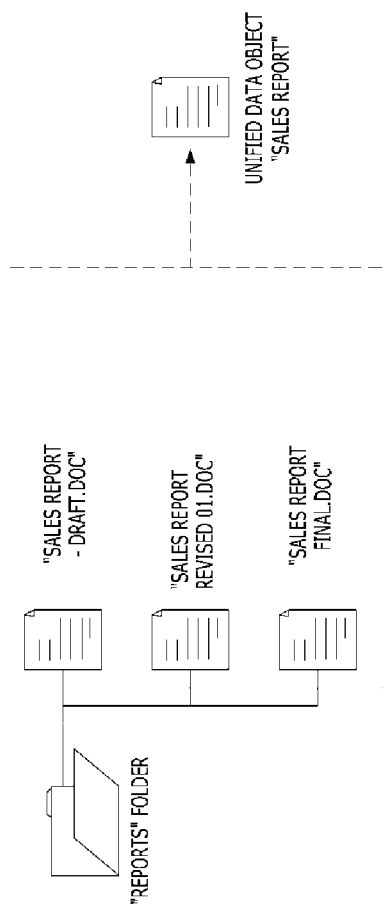

FIGS. 3A and 3B illustrate a version entity object of a unified data object.

As shown in FIG. 3A, according to the conventional data management system, when there are several files having the same objective and partially different contents, the files should be individually managed as their respective names. Accordingly, since there are complexity and difficulties of file management, and files having the same file name may be stored in different storage media, it may not be determined which file corresponds to the file content, e.g., whether "sales department report. doc" stored in a USB drive is a first draft or a final draft stored in a report folder.

In order to solve the above-described problems, when there are multiple files that have the same purpose and partially modified content as shown in FIG. 3B, the present invention may manage the files as the unified data object, which is called a "sales department report," and manage an object for each version, e.g., a first draft, a modified draft, and a final draft, using the version entity object of the unified data object. Accordingly, when the user intends to check the content of the unified data object, and the version entity object is present, the present invent informs that there is data for each version and provides data intended to be viewed/browsed by the user.

The unified data object is composed of the logical entity object and the version entity object. However, the unified data object is composed of only one of the two.

Figure 4:
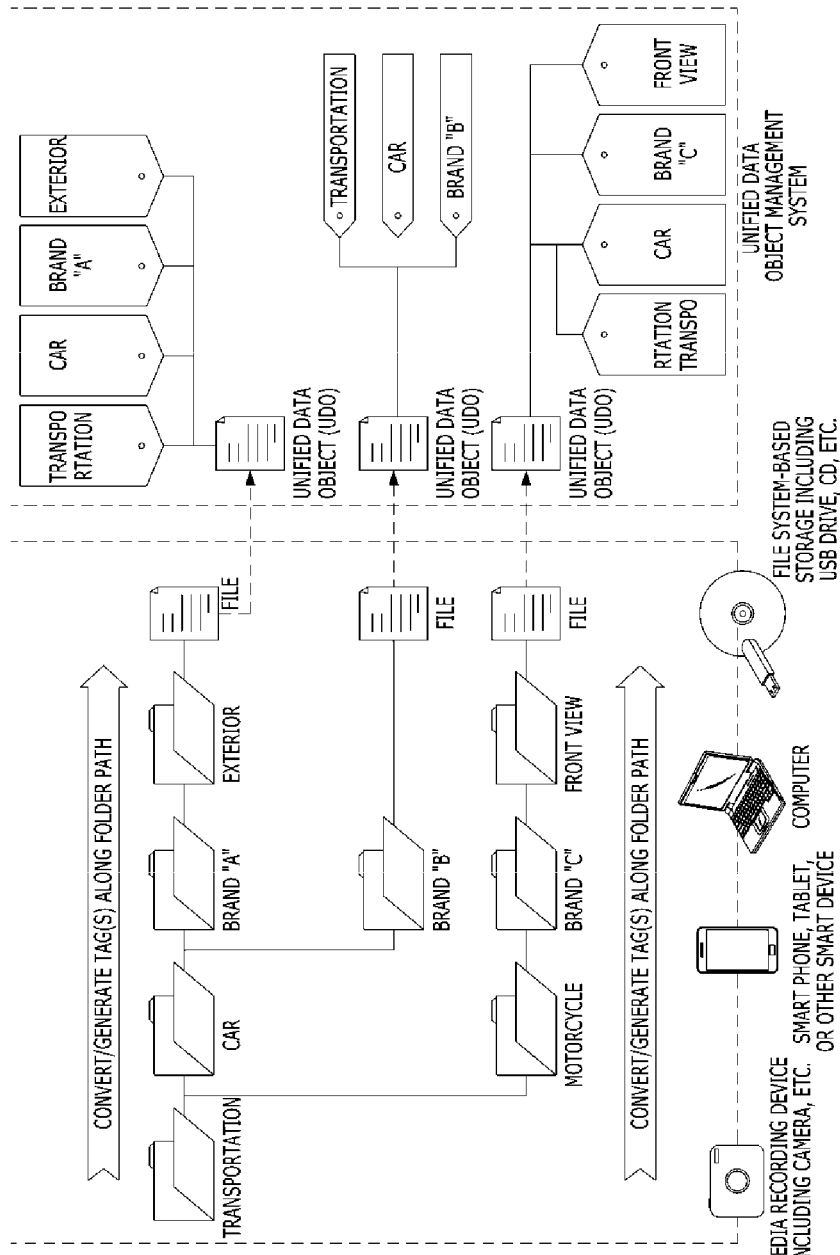
FIG. 4 is a diagram illustrating that a unified data object management system converts a general file system into a unified data object system according to an embodiment of the present invention.

FIG. 4 shows that a unified data object management system converts data of a general file system into that of a unified data object system according to an embodiment of the present invention.

That is, the unified data object management system may further include a unified data object conversion unit. The unified data object conversion unit obtains/derives, as tag information, a name of a folder of a conventional file system or metadata of a file included in the folder and incorporates the obtained/derived tag information into a data object included in the folder to convert the data object into a unified data object.

For example, FIG. 4 shows an example in which the folder name of the file system is obtained/derived as the tag information. The files stored in the conventional folder structure are converted into a unified data object including tag information such as "means of transportation," "vehicle," "brand A," and "external," a unified data object including tag information such as "means of transportation," "vehicle," and "brand B," and a unified data object including tag information such as "means of transportation," "motorcycle," "brand C," and "front photo," and then managed.

Figure 5:
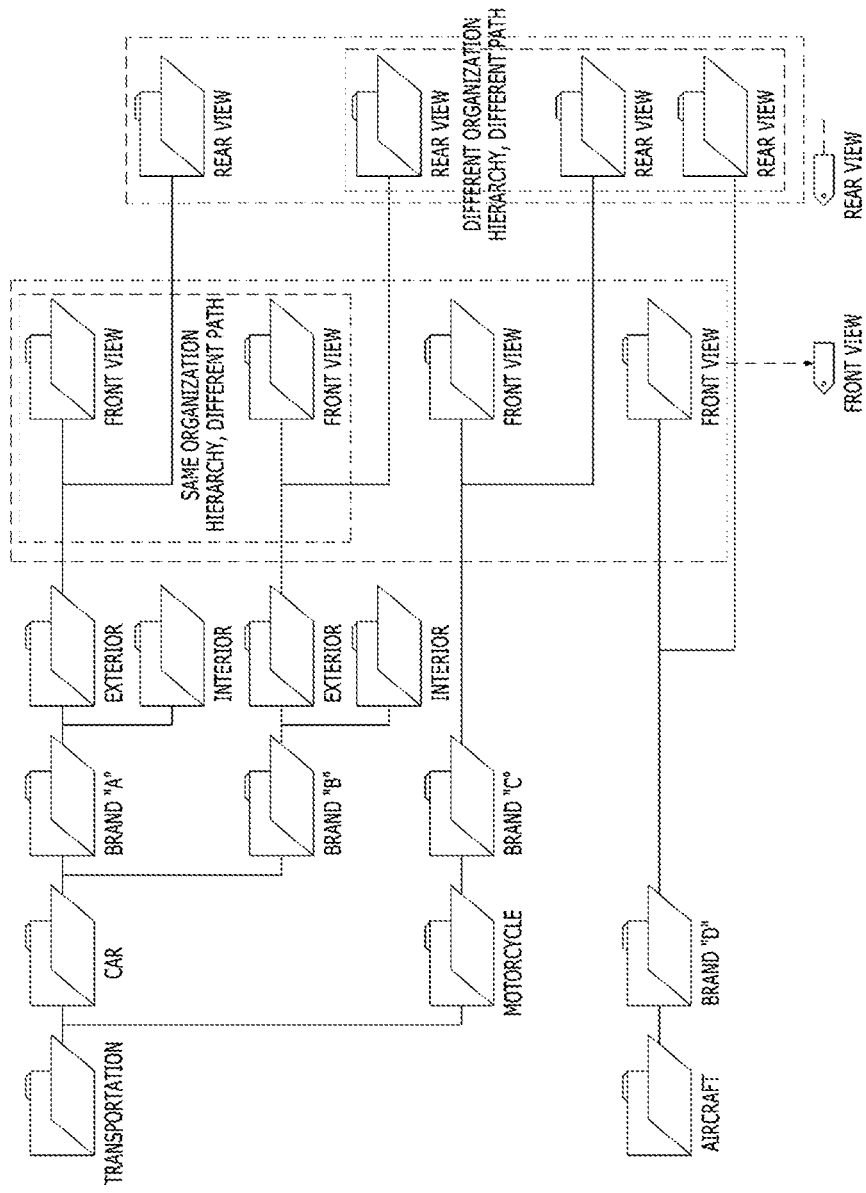
FIG. 5 is a diagram illustrating that a unified data object management system provides a unified data object according to an embodiment of the present invention.

FIG. 5 shows as example in which a unified data object management system provides a unified data object according to an embodiment of the present invention.

The unified data object management system manages the unified data object on the basis of the tag information and does not strictly restricted to a vertical structure such as a tree structure provided in the conventional file system. Accordingly, on a condition that data objects positioned in different folders have the same tag information in the conventional file system, when the user requests data objects including the tag information, the data objects may be allowed to be easily provided.

For example, according to the conventional technique, in order to inquire about a data object stored in a folder "front photo" positioned below "brand C" of a folder "motorcycle" while browsing data objects stored in a folder "front photo" positioned below folders "brand A" and "brand B" of folder "vehicle" shown in FIG. 5, the browsed folder should be changed. However, the present invention searches for and provides the unified data object on the basis of the tag information. Accordingly, when the user requests data regarding "front photo," all unified data objects including "front photo" as the tag information are provided.

That is, the present invention allows the user to easily search for desired data by providing the data according to the tag information assigned to the unified data object rather than a folder concept of a vertical structure, and enables unified data objects to be traversed by inquiring about the unified data object on the basis of the tag information. In addition, the present invention may also provide the unified data objects on the basis of a plurality of pieces of tag information.

Figure 6:
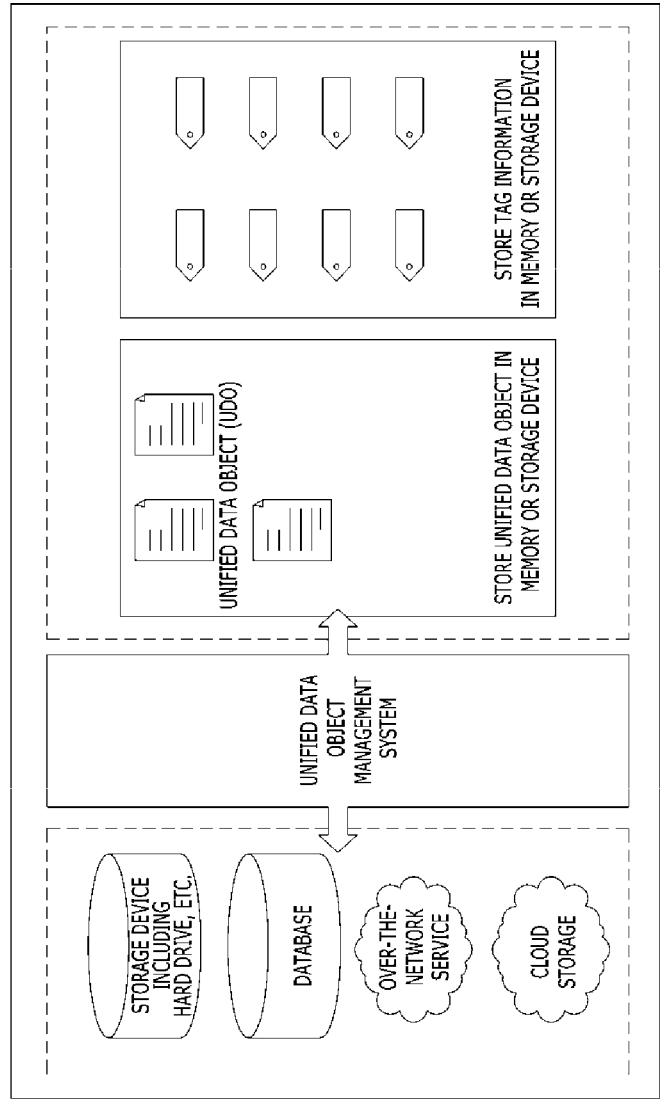
FIG. 6 is a diagram showing a unified data object management service system according to an embodiment of the present invention.
Figure 7:
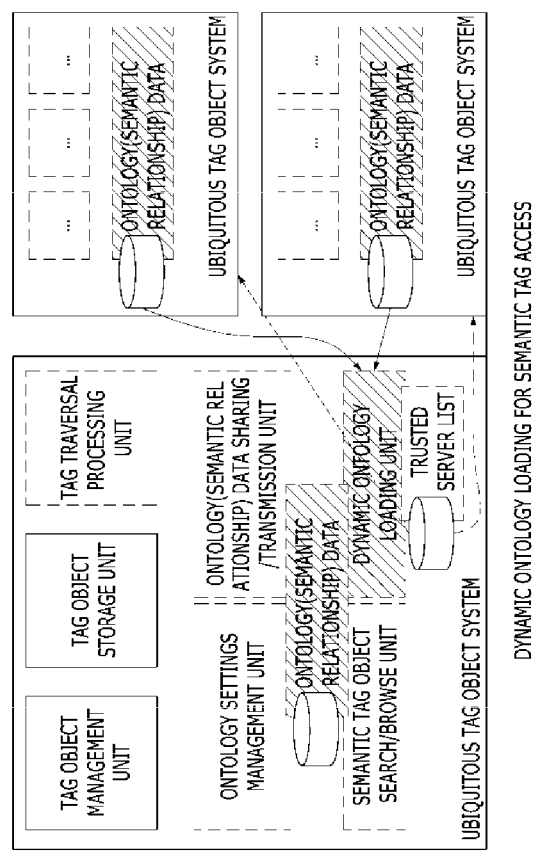
FIG. 7 is a diagram showing ontology for semantic tag access.
Figure 8:
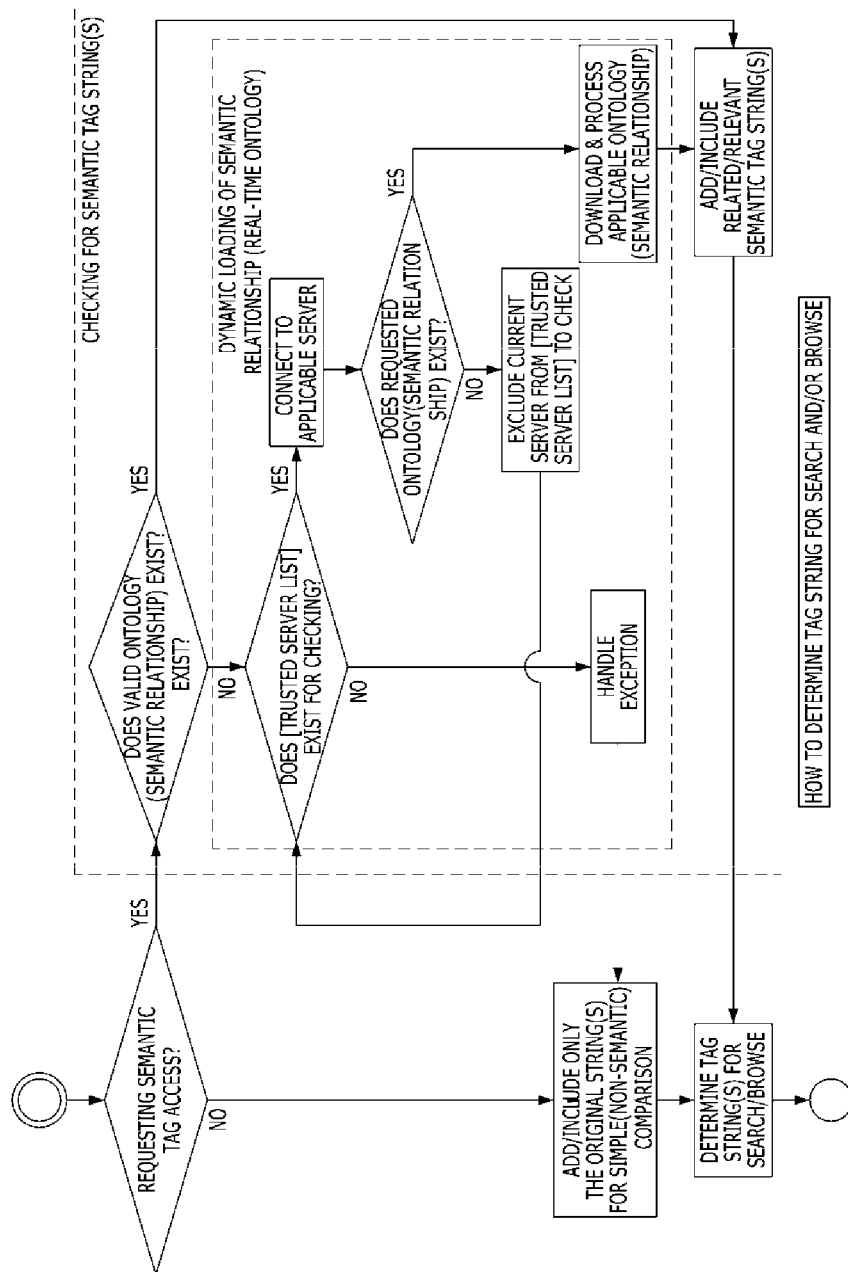
FIG. 8 is diagram showing a method of selecting a tag string for a browsing/search.

FIG. 6 shows a unified data object management service system according to an embodiment of the present invention. The unified data object management system may also be installed in the user device such as a personal computer (PC) or a smart device to provide a service for the unified data object and the tag object. Alternatively, the unified data object management system may be installed in a unified data object management server, database, or cloud storage to provide a unified data object service to a user device that has accessed thereto.

In this case, a plurality of user devices may be allowed to access the unified data object management server to create, modify, delete, or view/browse the unified data object.

Alternatively, only user devices having a specific authority may be allowed to manage the unified data object using an authority tag, etc.

The above-described subject matter of the present invention is to be considered illustrative and not restrictive, and it should be understood that numerous other modifications and embodiments can be devised by those skilled in the art that will fall within the spirit and scope of the principles of the present invention. Accordingly, the embodiments of the present invention are to be considered descriptive and not restrictive of the present invention, and do not limit the scope of the present invention. The scope of the present invention should be determined by the following claims and their appropriate legal equivalents.

The invention claimed is:

1. A unified data object management system comprising at least one processor to implement:
   a logical object management unit configured to manage, by using tag information, a logical entity object of a unified data object comprising a file, non-file data, or dynamic data, assigned with one or more pieces of the tag information, and shared and/or transmitted across various applications, user accounts, devices, and/or servers; and
   a version object management unit configured to manage a version entity object of the unified data object,
   wherein a plurality of logical entity objects are stored in storage, and
   wherein with respect to two or more logical entity objects that have common tag information, the logical object management unit is configured to, based on the common tag information, allow search and browsing of the two or more logical entity objects, irrespective of individual locations of the two or more logical entity objects in the storage, by organizing and grouping the two or more logical entity objects into a set.

2. The unified data object management system of claim 1, wherein the version object management unit creates and manages the version entity object of the unified data object when the unified data object is created or modified, and provide the unified data object according to the version entity object when the unified data object is requested.

3. The unified data object management system of claim 1, wherein the logical object management unit assigns a unique ID to the created unified data object or version entity object when the unified data object or the version entity object is created, and performs modification, deletion, display of related information, display of preview, or output of contained data on the unified data object or version entity object assigned with the unique ID when the unique ID is given.

4. The unified data object management system of claim 1, wherein the dynamic data includes a function or dynamic data, such as dynamic web content, a database query result, real-time data, or computational result, which is expressed in a form of a uniform resource locator (URL).

5. The unified data object management system of claim 1, wherein the unified data object includes a plurality of unified data objects and includes an aggregate unified data object created based on a user's need/convenience or related/relevant usage information.

6. The unified data object management system of claim 1, further comprising a unified data object conversion unit configured to obtain/derive a name of a folder of a file system, metadata of a file included in the folder, a name of the file of the file system, or metadata of the file of the file system as the tag information and incorporate the obtained/derived tag information into a data item included in the file system or the folder to convert the data item into the unified data object.

7. A ubiquitous tag object system comprising at least one processor to implement:
   a tag object storage unit configured to store a tag object comprising a tag string having zero or one or more characters, a tag ID, and information regarding zero or one or more tag types (tag type information) and shared and/or transmitted across various applications, user accounts, devices, and/or servers;
   a tag object management unit configured to create, modify, or delete the tag object; and
   a tag traversal processing unit configured to take as input one or more tag strings or one or more tag IDs and output information on a tagged/taggable object assigned with a tag object including the tag string or the tag ID,
   wherein with respect to two or more tagged/taggable objects assigned with a common tag object, the tag traversal processing unit is configured to, based on the common tag object, allow search and browsing of the two or more tagged/taggable objects, irrespective of individual locations of the two or more tagged/taggable objects in a storage, by organizing and grouping the two or more tagged/taggable objects into a set.

8. The ubiquitous tag object system of claim 7, wherein, the tag object further includes auxiliary tag type information or tag user information, and
   the auxiliary tag type information includes description of a format or content of the tag type information.

9. The ubiquitous tag object system of claim 8, wherein the tag user information includes at least one of permission/rights information regarding the tag object, tag order/priority information regarding the tag object, permission/rights information regarding a data item to which the tag object is applied, security settings information related to encryption of the data item to which the tag object is applied, and tag application scope information regarding the data item to which the tag object is applied.

10. The ubiquitous tag object system of claim 9, wherein the tag object management unit creates the tag order/priority information regarding the tag object using the at least one of the permission/rights information regarding the tag object, the permission/rights information regarding the data item to which the tag object is applied, the security settings information related to encryption of the data item to which the tag object is applied, and the tag application scope information regarding the data item to which the tag object is applied.

11. The ubiquitous tag object system of claim 7, wherein the tag object management unit creates an aggregate ubiquitous tag including a plurality of tag objects based on a user's need/convenience or related/relevant usage information and stores and manages the aggregate ubiquitous tag in the tag object storage unit.

12. The ubiquitous tag object system of claim 7, wherein the tag object management unit takes as input one or more tag strings or one or more tag IDs and outputs a collection/set of tag IDs of tag objects including the tag strings or a collection/set of tag strings of tag objects including the tag IDs.

13. The ubiquitous tag object system of claim 7, wherein the tag object management unit takes as input one or more tag strings or one or more tag IDs, selects the tag objects, expresses operated relationship between the tag objects by applying "&", "&&", "|", "||", "+", "−", ";", ",", "AND", "OR", "XOR" or "NOT" tag operator/notation when the tag objects are selected by a plurality of tag strings or a plurality of tag IDs, and applies "(" and ")", "[" and "]", or "{" and "}" to determine an order and/or scope when there is one or more tag operators/notations.

14. The ubiquitous tag object system of claim 7, wherein the tag traversal processing unit is further configured to take as input the one or more tag strings or the one or more tag IDs and output information on a tag string or tag ID of another tag assigned to the tagged/taggable object.

15. The ubiquitous tag object system of claim 7, further comprising a semantic tag object search unit configured to search for a tag object including the tag string and a tag object having a meaning corresponding to a synonymous/equivalent relationship, inclusion/containment relationship, or association/dependency relationship with the tag.

16. The ubiquitous tag object system of claim 7, further comprising a semantic tag object configuration unit configured to set or modify ontology (semantic relationship) data regarding a tag object including the tag string and a synonymous/equivalent relationship, inclusion/containment relationship, or association/dependency relationship with the tag.

17. The ubiquitous tag object system of claim 7, further comprising an ontology (semantic relationship) data sharing/transmission unit configured to share or transmit ontology (semantic relationship) data regarding a tag object including the tag string or a synonymous/equivalent relationship, inclusion/containment relationship, or association/dependency relationship with the tag.

18. The ubiquitous tag object system of claim 7, further comprising a dynamic ontology loading unit configured to dynamically download and install/apply ontology (semantic relationship) data from another ubiquitous tag object system present in a trusted server list when there is not valid ontology (semantic relationship) data regarding a tag object including the tag string or a synonymous/equivalent relationship, inclusion/containment relationship, or association/dependency relationship with the tag.

19. The ubiquitous tag object system of claim 14, wherein the tag traversal processing unit takes as input one or more tag strings or one or more tag IDs and outputs information regarding tagged/taggable object(s) assigned with tag object(s) having a meaning of synonymous/equivalent relationship, inclusion/containment relationship or association/dependency relationship with the tag object including the tag strings or the tag IDs or outputs tag string(s) or a tag ID(s) of other tag(s) assigned to the above tagged/taggable object(s) assigned with tag object(s) having a meaning of the above relationships.

20. A unified data object management service system comprising at least one processor to implement:
   a unified data object management unit configured to manage, by using tag objects, a unified data object comprising a file, non-file data, or dynamic data, assigned with one or more of the tag objects, and shared and/or transmitted across various applications, user accounts, devices, and/or servers; and
   a tag object management unit configured to manage a tag object comprising a tag string having zero or one or more characters, a tag ID, and information regarding zero or one or more tag types (tag type information), shared and/or transmitted across various applications, user accounts, devices, and/or servers, and assigned to the unified data object,
   wherein a plurality of logical entity objects are stored in storage, and
   wherein with respect to two or more logical entity objects assigned with a common tag object, the unified data object management unit is configured to, based on the common tag object, allow search and browsing of the two or more logical entity objects, irrespective of individual locations of the two or more logical entity objects in the storage, by organizing and grouping the two or more logical entity objects into a set.

21. The unified data object management service system of claim 20, wherein the unified data object management unit takes as input one or more tag strings or one or more tag IDs and outputs the unified data object assigned with a tag object including the tag string or the tag ID.

22. The unified data object management service system of claim 20, wherein the unified data object management unit takes as input one or more tag strings or one or more tag IDs, selects the unified data object, expresses operated relationship of the unified data object by applying "&", "&&", "|", "||", "+", "−", ";", ",", "AND", "OR", "XOR" or "NOT" tag operator/notation when the unified data object is selected by a plurality of tag strings or a plurality of tag IDs, and applies "(" and ")", "[" and "]", or "{" and "}" to determine an order and/or scope when there is one or more tag operators/notations.

23. The unified data object management service system of claim 20, wherein,
   the tag object management unit creates and manages a data-linked tag object including information regarding the unified data object to express the unified data object, and
   the unified data object management unit accesses and/or manages the unified data object such that a unified data object encapsulated in and/or linked to the data-linked tag object is assigned to another unified data object in a form of a tag object.

24. A unified data object management service system comprising at least one processor to implement:
   a unified data object management server configured to apply/set a tag object to unified data object comprising a file, non-file data, or dynamic data, manage the unified data object based on the tag object, and provide the unified data object when the unified data object is requested; and
   a user device configured to create, search for, or manage the unified data object in communication with the unified data object management server,
   wherein a plurality of logical entity objects are stored in storage, and
   wherein with respect to two or more logical entity objects that are applied/set with a common tag object, the user device, in communication with the unified data object management server, is configured to, based on the common tag object, allow search and browsing of the two or more logical entity objects, irrespective of individual locations of the two or more logical entity objects in the storage, by organizing and grouping the two or more logical entity objects into a set.

25. The unified data object management service system of claim 24, wherein the unified data object management server communicates with multiple user devices and provides common unified data object(s) and/or tag object(s) to the multiple user devices.

\* \* \* \* \*